US009165001B1

(12) United States Patent
Upadhyay et al.

(10) Patent No.: US 9,165,001 B1
(45) Date of Patent: Oct. 20, 2015

(54) MULTI STREAM DEDUPLICATED BACKUP OF COLLABORATION SERVER DATA

(71) Applicants: Navneet Upadhyay, Ghaziabad (IN); Manjunath Tadahal, Bangalore (IN)

(72) Inventors: Navneet Upadhyay, Ghaziabad (IN); Manjunath Tadahal, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 31 days.

(21) Appl. No.: 13/720,814

(22) Filed: Dec. 19, 2012

(51) Int. Cl.
G06F 17/30 (2006.01)

(52) U.S. Cl.
CPC .... *G06F 17/30079* (2013.01); *G06F 17/30156* (2013.01)

(58) Field of Classification Search
CPC ................................................. G06F 17/30067
USPC ............................................................ 707/652
See application file for complete search history.

(56) References Cited

U.S. PATENT DOCUMENTS

| 5,724,500 | A | * | 3/1998 | Shinmura et al. | 714/6.3 |
| 7,574,461 | B1 | * | 8/2009 | Armorer et al. | 1/1 |
| 7,685,459 | B1 | * | 3/2010 | De Spiegeleer et al. | 714/6.12 |
| 7,921,080 | B2 | * | 4/2011 | Taylor | 707/648 |
| 7,987,326 | B2 | * | 7/2011 | Nguyen | 711/162 |
| 8,296,271 | B1 | * | 10/2012 | Richardson et al. | 707/674 |
| 2005/0108484 | A1 | * | 5/2005 | Park | 711/162 |
| 2010/0257142 | A1 | * | 10/2010 | Murphy et al. | 707/681 |

* cited by examiner

*Primary Examiner* — Rehana Perveen
*Assistant Examiner* — Hicham Skhoun
(74) *Attorney, Agent, or Firm* — Van Pelt, Yi & James LLP

(57) ABSTRACT

Techniques to backup collaboration server data are disclosed. An indication to begin backup of a collaboration server dataset is received. An associated directory is walked in a prescribed order to divide the dataset into a prescribe number of approximately equal-sized subsets. A separate subset-specific thread is used to back up the subsets in parallel. In some embodiments in which the collaboration data is stored in multiple volumes, a volume-based approach is used to back up the volumes in parallel, e.g., one volume per thread. In some embodiments, transaction logs are backed up in parallel with volumes of collaboration data.

19 Claims, 8 Drawing Sheets

MULTI STREAM DEDUPLICATED BACKUP OF COLLABORATION SERVER DATA

BACKGROUND OF THE INVENTION

Enterprise and other collaboration applications and servers, such as the IBM® Lotus Domino server, facilitate communication (e.g., email, messaging) and other collaboration via network communications. EMC® Avamar® is a de-duplication backup software and system. Avamar® maintains a cache file on the client system being backed up which contains SHA-1 hashes of the data which has already been backed up to the Avamar server. This file will be referred during each backup operation to identify the data that has been backed up onto the Avamar server, e.g., to avoid duplicative back up of the same data in a current or subsequent backup.

In the case of the IBM® Lotus Domino server, a backup agent interacts with the server to obtain user data and feeds the data to a de-duplicating backup process. The backup process computes the SHA-1 hash of the data during backup and looks it up in the local cache. If it finds the computed hash in the cache, then the data will not be transferred to the Avamar server; instead just the hash of the data is sent to the server, which is much smaller in size as compared to original data. If the computed hash is not present in the local cache, then the data is transferred to the Avamar server and its hash is added to the cache.

BRIEF DESCRIPTION OF THE DRAWINGS

Various embodiments of the invention are disclosed in the following detailed description and the accompanying drawings.

DETAILED DESCRIPTION

Figure 1:
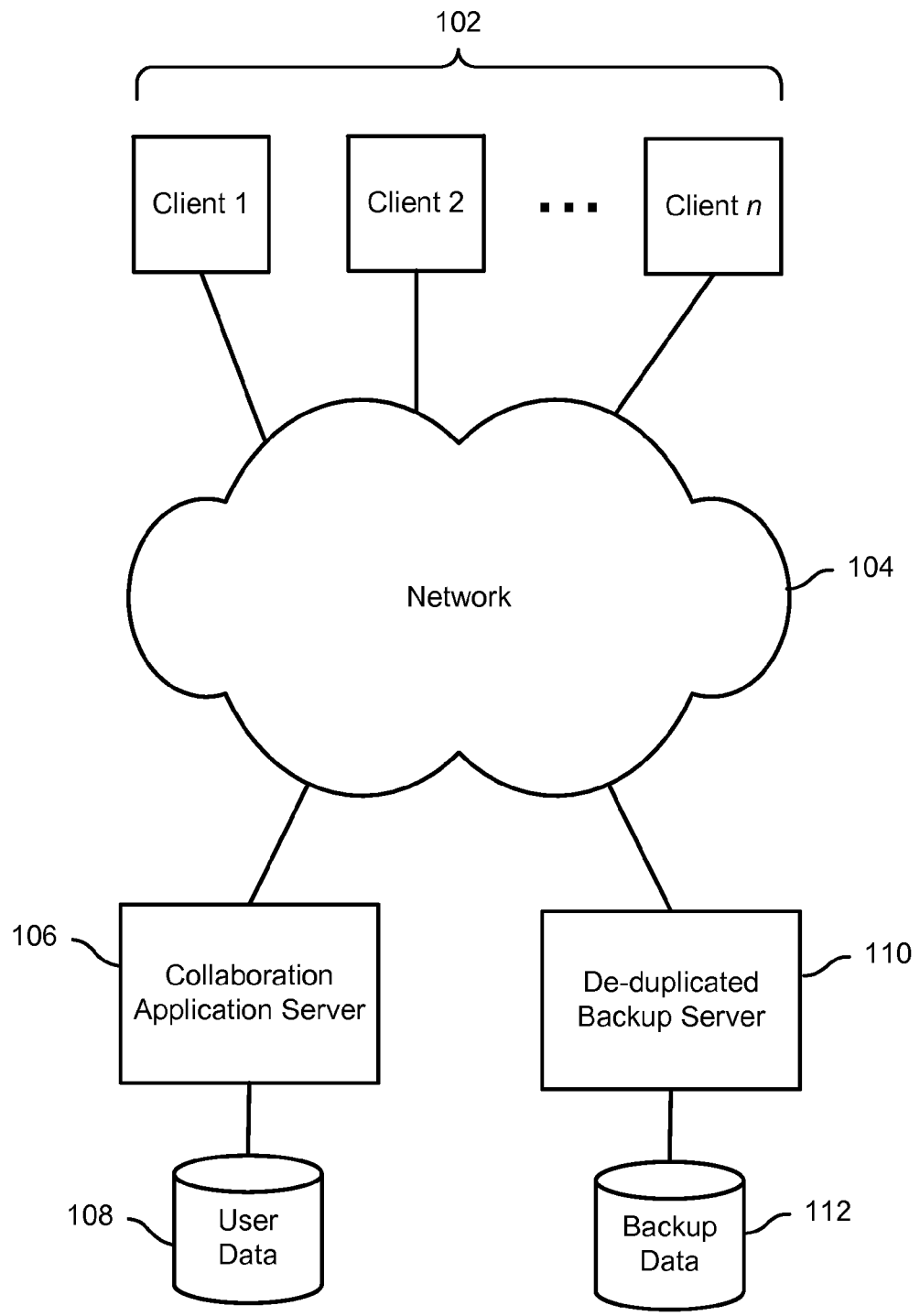
FIG. 1 is a block diagram illustrating an embodiment of a network environment and system to backup collaboration data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Multi stream de-duplicated backup of collaboration server data is disclosed. In various embodiments, collaboration server backup is performed using a configurable number of threads. The threads may be used to backup collaboration data based on size, i.e., dividing the data to be backed up into n sets of roughly equal size, where n is the configured number of threads, and having each thread work on an assigned set of data in parallel; or in a multi-volume installation by assigning one thread per volume up to the configured number of threads. De-duplication cache hits are maximized in the sized-based approach by walking the dataset directory structure in a consistent way. In the volume-based approach, a local cache per volume is used and named in a way that ensures the same cache is used for the same volume each backup. In some embodiments, transaction logs are backed up in parallel with underlying data, with a second pass being made of the transaction logs once all dataset backup is complete to ensure any transactions received during backup are captured.

FIG. 1 is a block diagram illustrating an embodiment of a network environment and system to backup collaboration data. In the example shown, a plurality of client systems 102 connect via a network 104 to a collaboration application server 106, such as an IBM Lotus Domino server. The collaboration server 106 in various embodiments provides one or more of email, messaging, and custom collaboration application services to users of client systems 102. Each user has associated collaboration data (e.g., email or other messages, attachments, other collaboration content) stored in a user-specific database in user data store 108. Periodically, or as requested, user data 108 is backed up via network 104 and/or one or more other networks to a de-duplicated backup server 110, which stores backup data in backup data storage 112. In various embodiments, backup server 110 comprises an EMC® Avamar® server. Avamar® agents on the collaboration server 106 (not shown in FIG. 1) facilitate de-duplicated backup to backup server 110, including by storing on collaboration server 106 a cache or other index or data store of SHA-1 or other hash values computed based on user data that has already been sent via network 104 to backup server 110.

Figure 2:
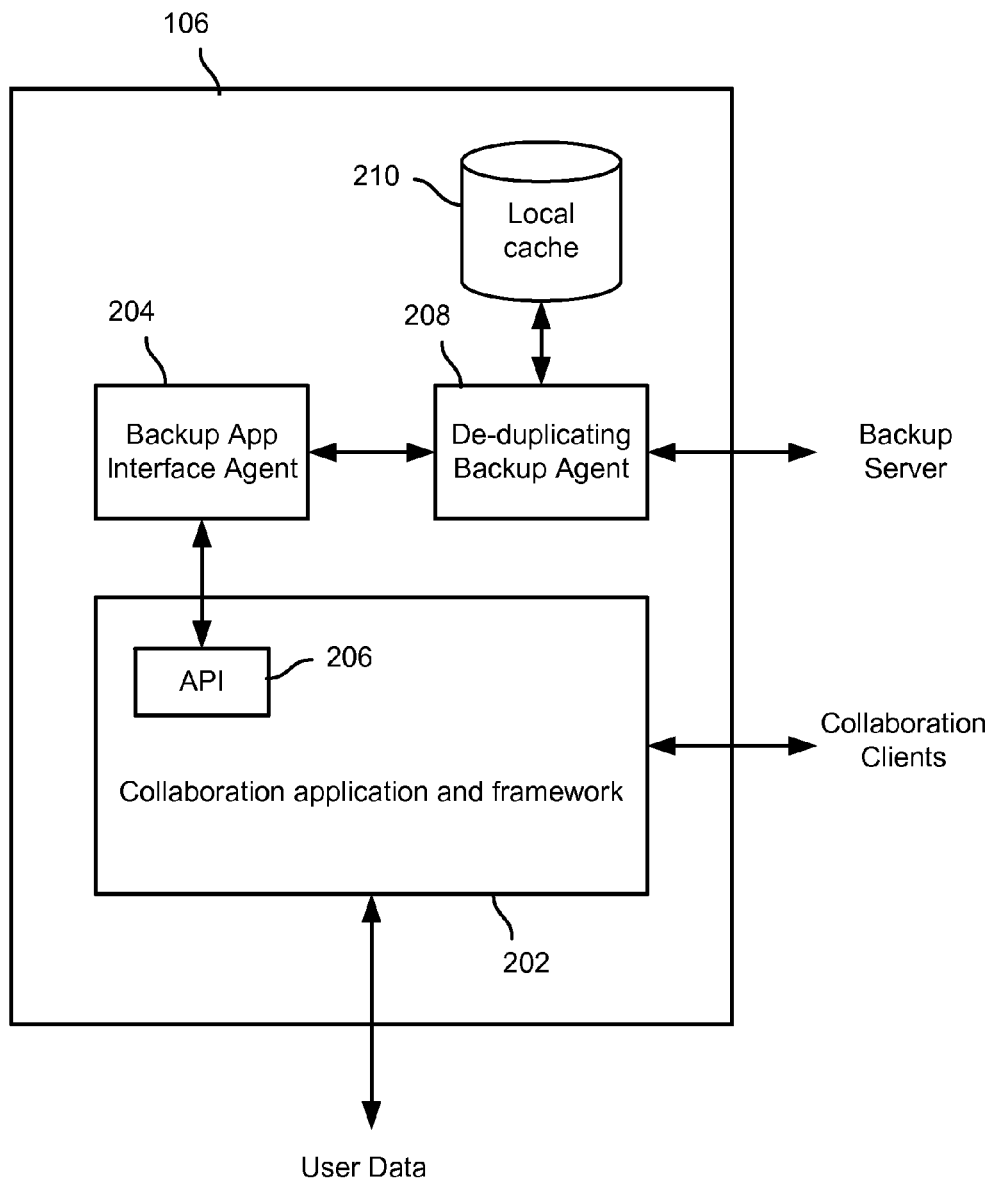
FIG. 2 is a block diagram illustrating an embodiment of a collaboration server configured to backup collaboration data.

FIG. 2 is a block diagram illustrating an embodiment of a collaboration server configured to backup collaboration data. In the example shown, collaboration server 106 includes a collaboration application and/or framework 202, provided for example by using a processor included in server 106 to execute program code stored in a memory or other storage device comprising server 106. A backup application interface agent 204 communicates with the collaboration application and/or framework 202 via an application programming interface (API) 206 of collaboration application and/or framework 202, such as the C programming interface of the IBM Lotus Domino server, to backup user data associated with collaboration application and/or framework 202 and/or to use previously backed up data to restore user data. In some embodiments, the backup application interface agent 204 comprises an "Avlotus" client side component associated with an Avamar server. In a backup operation, the backup application interface agent 204 obtains user data from collaboration application and/or framework 202 and provides the user data to a de-duplicating backup agent 208, which is configured to send locally de-duplicated data to a remote backup server, e.g., via a corporate local area network (LAN) or other network, e.g., network 104 of FIG. 1. The de-duplicating backup agent 208 uses a local cache 210 to avoid sending duplicate data to the remote backup server. For example, in some embodiments agent 208 computes a SHA-1 or other hash of user data received from backup application interface agent 204, and checks the cache to determine if the same hash has already been stored in the cache, which would indicate that the same data has already been sent previously by agent 208 to the remote backup server. If the computed hash is already present in the local cache 210, the agent 208 does not re-send the user data to the backup server and instead sends a reference, such as the hash value. If instead the computed hash is not found in the cache, the agent 208 stores the hash in the local cache 210 and sends the corresponding data to the remote server 208.

Typically, in prior approaches to performing de-duplicated backup of collaboration data a single backup thread has been used. For very large datasets, such an approach can result in backups taking a long time. Techniques to perform multi-thread, de-duplicated backup of collaboration data are disclosed. In various embodiments, either a size-based or a volume-based division of work among multiple backup threads running in parallel is used. Each backup thread has its own associated local cache. The backups are performed in a manner that maximizes the chances of a cache "hit", for example by dividing work among the threads so that the same thread and associated cache are most likely to back up the same data, since once a particular data has been backed up by a thread, the corresponding hash will be stored in that thread's local cache and the thread will know based on its own local cache not to send the same data to the remote backup server.

In some embodiments, an administrative user interface is provided to enable an administrator to configure one or more settings associated with multi-thread de-duplicated backup of collaboration server data. For example, in some embodiments an administrator can configured a prescribed and/or maximum number of threads to be used in parallel to perform backup. In some embodiments, an administrator may indicate via configuration data whether a size-based or volume-based backup should be performed. In some embodiments, a volume-based backup is performed if more than one volume is present in the dataset to be backed up. In the case of IBM Lotus Domino Server, for example, a common use case arises as an enterprise or other organizational user grows and adds further user accounts. It is very common, for example, to add an additional storage disk and to set up a new volume for the added disk. In such a case, a volume-based approach, described more fully below in connection with FIGS. 5 and 6, may be advantageous, since only one thread will make I/O requests to any given disk at any one time. In some embodiments, the presence of multiple volumes may be detected programmatically and the volume-based approach selected and/or used automatically based on the detected presence of multiple volumes.

The following example illustrates the volume-based approach as implemented in some embodiments:

In some embodiments, an IBM Lotus Domino server contains a SINGLE data directory (e.g., "C:\data") which contains all the information that needs to be backed up. The Data directory can also contain in various embodiments:

1. Multiple database links: Which can point to a database outside data directory and possibly on a different volume (outside 'C:' drive/volume), let's say it has two database links named dblink1.nsf (C:\data\dblink1.nsf) and dblink2.nsf (D:\data\dblink2.nsf) which points to C:\newdata\database1.nsf & D:\data\databasese2.nsf.

2. Multiple Directory links: Which can point to directory outside data directory and possibly to a directory on separate volume, let's say it has two directory links dirlink1.dir (C:\data\dirlink1.dir) and dirlink2.dir (C:\data\dirlink2.dir) which point to C:\data2 & D:/data2 respectively.

During backup a user typically will select just Lotus Domino data directory i.e. "C:\data" for backup. It is backup agent's duty to protect entire data i.e. everything inside 1. C:/data, 2. C:\data\dblink1 nsf, 3. D:\data\dblink2.nsf, 4. C:/data2 & 5. D:/data2.

In some embodiments, a backup agent automatically (without manual intervention or input) categorizes data based on volumes it resides on. So, the discovery thread will go through the Domino data directory (C:\data) and will identify all database and directory links and find out the locations they point to, and then divide them into lists based on volumes. So, the output of discovery thread in our example will be two lists:

List1: C:\data, C:\data\dblink1.nsf, C:/data2

List2: D:\data\dblink2.nsf, D:/data2

The backup agent then backs up each list using separate backup threads in some embodiments.

Figure 3:
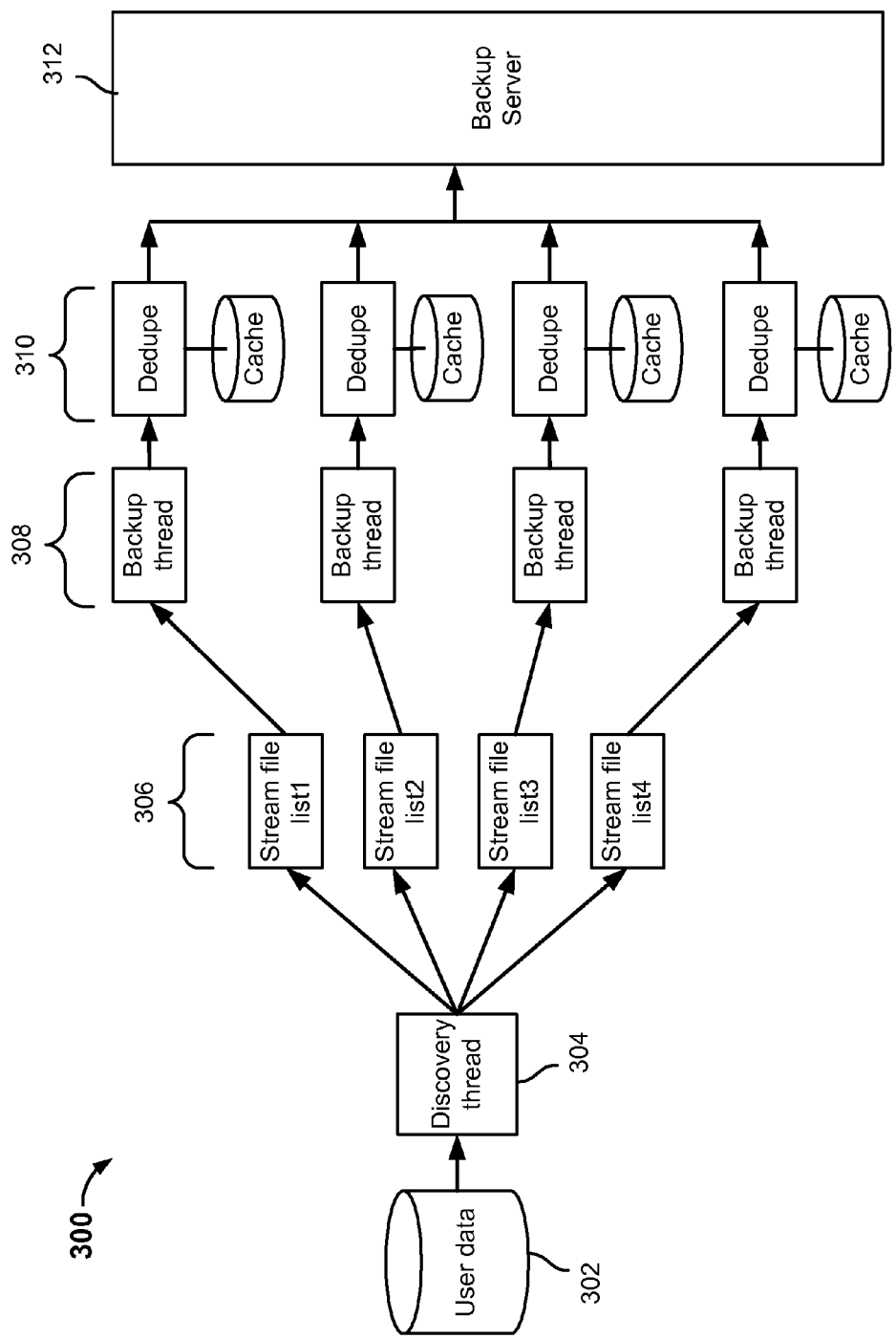
FIG. 3 is a block diagram illustrating an embodiment of a system to backup collaboration data.

FIG. 3 is a block diagram illustrating an embodiment of a system to backup collaboration data. In the example shown, a size-based approach is used in system 300 to divide up the dataset to perform a multi-thread backup. In the example shown, user data 302 includes a single volume, which may be typical of a small to medium enterprise user of IBM Lotus Domino Server, for example. A single discovery process or thread 304 walks a directory of the dataset in a prescribed, repeatable manner that results in portions of the directory being read in the same order as in prior backups. The discovery process 304 divides the dataset up into a number of roughly equal-sized subsets, the number corresponding to the number of backup threads that will be run in parallel. The discovery thread 304 generates and steams dynamically a set of file lists 306, one for each backup thread that will run in parallel. Each of a plurality of backup threads 308 reads file name/path information from its corresponding list 306 and reads the underlying file data from a storage location in which it is stored in user data 302. Each thread 308 feeds file data to a corresponding de-duplicating backup process 310, each of which uses a corresponding thread-specific local cache to check for duplicates, specifically to determine whether the same data was transferred previously by that de-duplicating backup process 310 to a remote backup server 310. If so, only the hash and/or a reference data is sent to the server 310. In some embodiments, if the SHA-1 or other hash is not in the local cache of that process 310, the process 310 sends the hash to the server 312 and the server 312 indicates whether the data resides already at the server 312. For example, another one of the de-duplicating backup processes 310 may have sent the same data to the server 312 in the current or a prior backup, as may occur, for example, for files close to a boundary between the subsets into which the user data 302 has been divided. In various embodiments, walking the directory of user data 302 in the same way for each backup increase the likelihood that most files will be included in the same subset and assigned to the same backup thread each time, increasing the likelihood of a cache hit. For example, if the user data at first includes 1000 GB of data and is backed up using four threads, each of which backs up approximately 250 GB of data, and by the time of a subsequent backup the user data has grown to 1100 GB of data, the data would be backed up in four subsets of approximately 275 GB of data each. In such a case, walking the directory in a same order as in the previous backup ensure that most files will be backed up using the same thread as in the prior backup, despite the overall increase in data, and even if the increase is not uniformly distributed throughout the data set. A high likelihood that duplicates will be detected on the collaboration server side is achieved, without requiring any change to the per-thread local cache architecture described herein.

Figure 4:
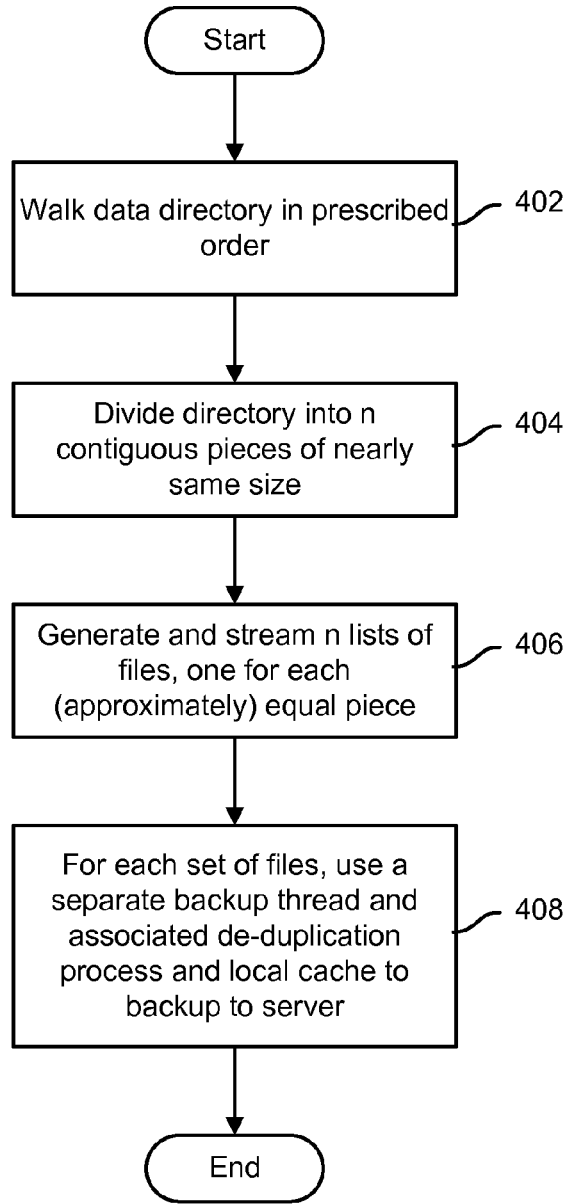
FIG. 4 is a flow chart illustrating an embodiment of a process to backup collaboration data.

FIG. 4 is a flow chart illustrating an embodiment of a process to backup collaboration data. In the example shown, size-based multi-thread backup is performed. A directory is walked in a prescribed order (402). The directory is divided up to define n subsets of the dataset, each comprising a contiguous (in the directory structure) set of files and the number n corresponding to a configured maximum number of backup threads to run in parallel (404). The file names/paths are read and streamed to generate n file lists, one for each backup thread (406). In some embodiments, while the list generation is ongoing, n backup threads run in parallel, and each thread reads files from a corresponding file list and provides the file data to a thread-specific de-duplicating backup process instance, each of which uses its own local cache to perform collaboration server-side de-duplication (408).

Figure 5:
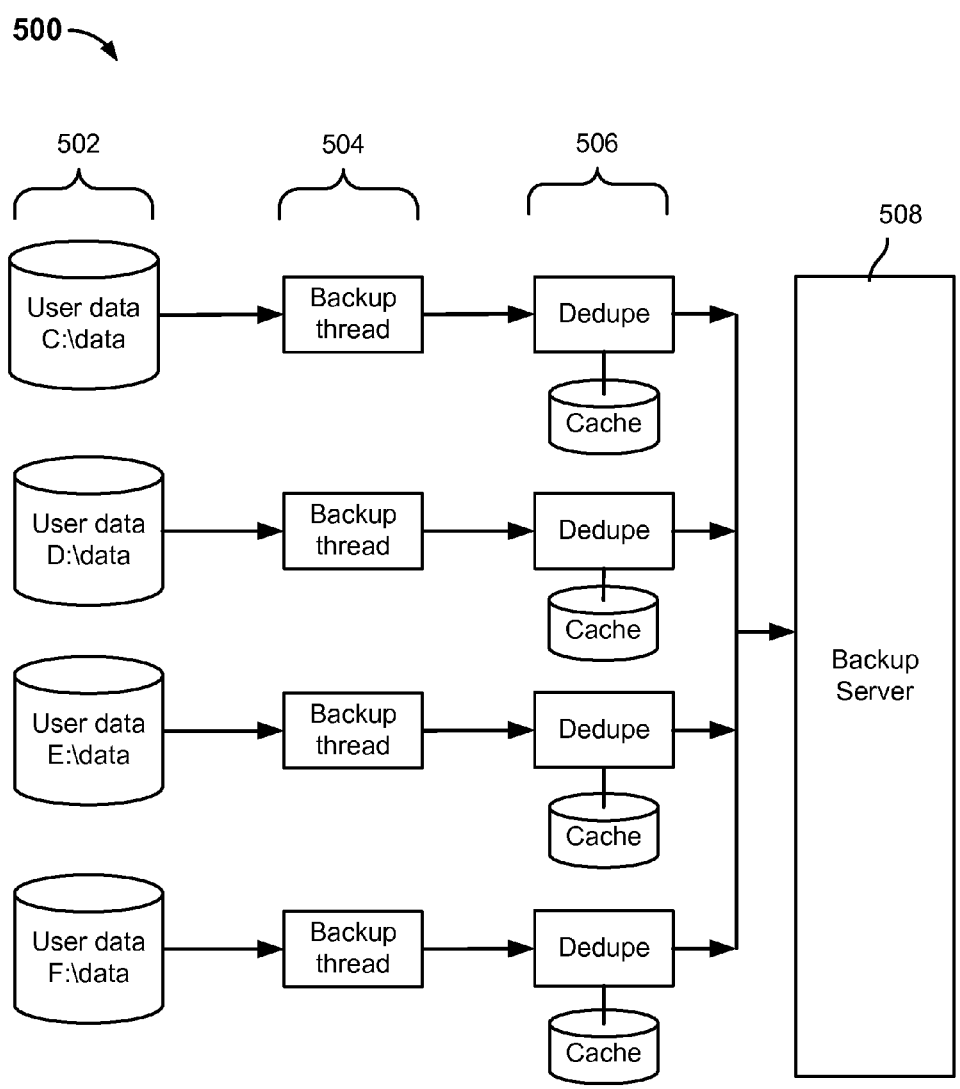
FIG. 5 is a block diagram illustrating an embodiment of a system to backup collaboration data.

FIG. 5 is a block diagram illustrating an embodiment of a system to backup collaboration data. In the example shown, a volume-based multi-thread backup is performed. In the system 500, user data 502 resides in four volumes, identified in this example as volumes, C, D, E, and F. For each volume, a separate volume-specific backup thread 504 reads user data (e.g., file data) and provides the data to a corresponding thread-specific de-duplicating backup process instance 506, each of which has its own local cache. In some embodiments, the discovery thread will go through the Domino data directory (e.g., C:\data) and will identify all database and directory links and find out the locations they point to, and then divide them into lists based on volumes A separate de-duplicating backup thread is assigned to each volume-specific list. The de-duplicating backup process instances 506 send backup data, as required (i.e., non-duplicative) to a remote backup server 508. While in the example shown the maximum number of threads is the same as the number of volumes, in some embodiments one thread per volume will be spawned and used up to a maximum configured number of threads. Fewer than the maximum number of threads may be used, if there are fewer volumes than the maximum number of threads, to avoid having multiple threads sending competing I/O requests to the same volume. In some embodiments, if the number of volumes exceeds the maximum number of threads, the maximum number is spawned and used one-per-volume, and as the backup of a volume is completed the associated thread is allocated to begin and perform to completion the backup of another volume, and so on, until all volumes have been backed up.

Figure 6:
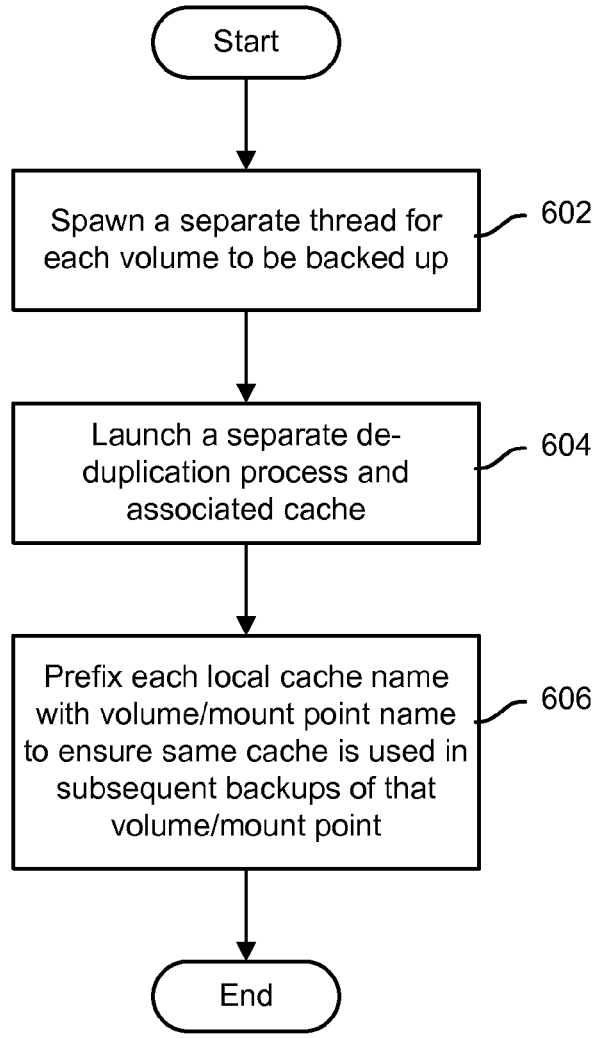
FIG. 6 is a flow chart illustrating an embodiment of a process to backup collaboration data.

FIG. 6 is a flow chart illustrating an embodiment of a process to backup collaboration data. In the example shown, a separate thread is spawned for each volume to be backed up, in some embodiments up to a configured maximum number of threads (602). A separate thread-specific de-duplicating backup process, each with its corresponding associated local cache, is launched for each backup thread (604). The filename of each local cache is prefixed with the volume and/or mount point with which it is associated, or in various embodiment volume identifying information is otherwise incorporated into the cache name and/or associated data, so that in each backup of a volume the same local cache is associated with the de-duplicating backup process instance used to backup that volume/mount point (606).

Figure 7:
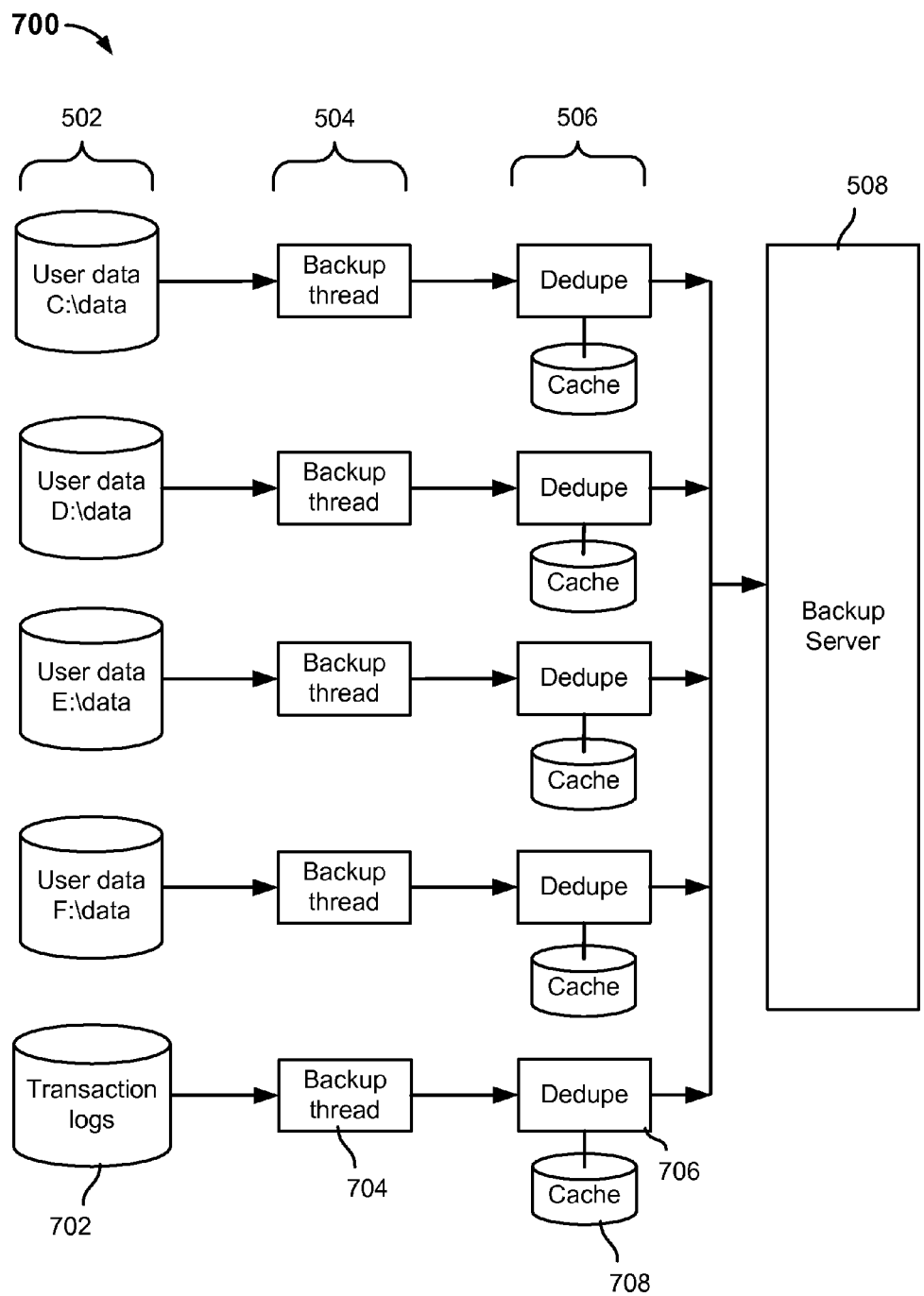
FIG. 7 is a block diagram illustrating an embodiment of a system to backup collaboration data.

FIG. 7 is a block diagram illustrating an embodiment of a system to backup collaboration data. A backup collaboration server data includes a backup of one or more transaction logs, e.g., one log per volume/mount point. As collaboration data is added, read, modified, or deleted, for example, a record of the interaction is recorded in a corresponding transaction log. In an incremental backup, for example, transaction log data may be backed up and/or otherwise used to determine the incremental changes that have been made to the dataset since the last backup. In an incremental backup, in particular, much of the data required to be backed up may be in the transaction logs, as opposed to in the one or more volumes of collaboration data. Typically, transaction logs are backed up once the backup of all underlying data required to be backed up has been completed. In the approach illustrated in FIG. 7, however, the transaction logs are backed up in parallel with the backup of the underlying collaboration data volumes. In the example system 700 of FIG. 7, the system of FIG. 5 has been augmented by adding a backup in parallel of transaction logs 702 using a transaction log specific backup thread 704 and an associated de-duplicating backup process instance 706 and associated local cache 708. Transaction log entries in transaction logs 702 are backed up to remote backup server 508 in parallel with the underlying data in volumes 502. In some embodiments, the system 700 remains "live" and users may make changes to the data in volumes 502 while the backup is being performed, resulting in transactions being added to the transaction logs 702 while the backup is underway. To ensure all transactions are included in the backup, in some embodiments once the backup of data in volumes 502 has been completed and the first pass backup of transaction logs 702 is done, a second pass through the transaction logs 702 is made to identify and back up to server 508 any transactions that may have been added during the backup.

Figure 8:
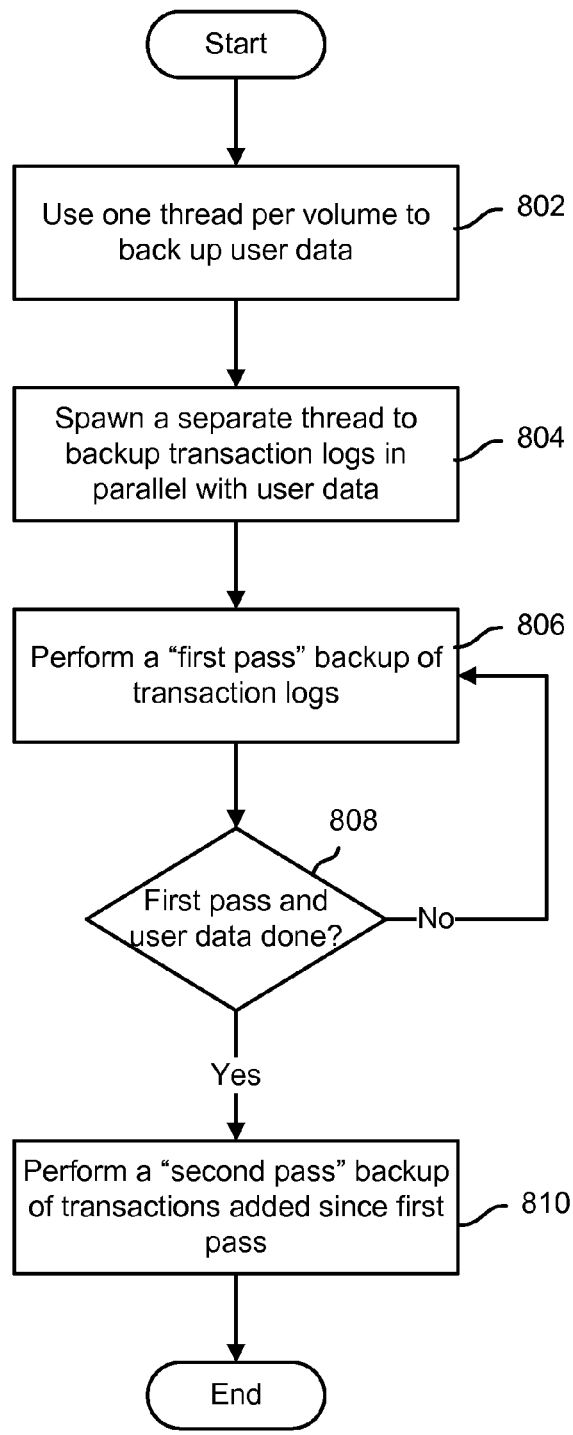
FIG. 8 is a flow chart illustrating an embodiment of a process to backup collaboration data.

FIG. 8 is a flow chart illustrating an embodiment of a process to backup collaboration data. In the example shown, one thread per volume (in some embodiments up to a maximum number of threads) is used to back up user data in parallel (802). A separate thread is spawned to back up transaction logs in parallel with the backup of the user data (804). A first pass backup of the transaction logs is performed while the backup of user data is underway (806). Once the backup of the user data and the first pass through the transaction logs have been completed (808), a second pass is made through the transaction logs to pick up any transactions that may have been added while the backup of user data was under way and as a result may not have been present to be included in the first pass backup of the transaction logs (810).

Domino server transaction logs typically reside in a single directory which can be configured while setting up the Domino server. Domino recommends that these transaction logs reside on a separate disk from that of other Domino data for performance reasons. For example, if transaction logs are configured to reside in the E:\txnlog directory, now all transaction logs for Domino server (all databases) reside in this directory.

If transaction logging is enabled user can take an Incremental backup of Domino server. During incremental backup only newly created databases and databases whose certain properties have changed (like DBIID) are supposed to be backed up followed by the backup of the transaction logs.

The traditional approach is to first backup the data i.e. to walk through all the databases, see if they need to be backed up or skipped, if the database needs to be backed up it is backed up. Then in the end all transaction logs are backed up.

In various embodiments, the above transaction log backup task is performed in parallel with database backup when the volume based approach is used. One backup thread backs up the transaction logs, and other normal backup threads take incremental backup of databases (these backup threads have to walk the directory structure, have to decide whether to backup a database or skip it and backup the data).

Once all normal backup threads finish, we again check if additional transaction logs are generated and back them up. There are many advantages of this a) Normal backup threads are mostly skipping the databases, most of the time they are executing logic of deciding whether to skip the database or to back them up. During this time network bandwidth is unutilized. The transaction log backup thread can back up data during this time and there by maximizing backup throughput. B) Since transaction log thread is running on its own disk it gives same advantages as that of volume based backups.

Using techniques disclosed herein, multi-thread backup of collaboration server data may be performed in a manner that maximizes the efficiency of the collaboration server side de-duplication and completes the backup of collaboration server data, including in some embodiments associated transaction logs, in an efficient and timely manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   receiving an indication to begin backup of a collaboration server dataset;
   walking an associated directory in a prescribed order to divide the dataset into a prescribe number of approximately equal-sized subsets, wherein the directory comprises a plurality of files; and
   using a separate subset-specific thread to back up the subsets in parallel;
   wherein each subset-specific backup thread is configured to provide data included in that subset to a backup-thread specific de-duplicating backup process instance configured to perform de-duplication processing with respect to the subset and a corresponding subset associated with a prior backup; and wherein the corresponding subset was determined by walking the associated directory in the prescribed order at a prior time with which the prior backup is associated.

2. The method of claim 1, wherein the prescribed number of subsets corresponds to a configured maximum number of concurrent backup threads.

3. The method of claim 1, wherein the associated directory is walked in the same prescribed order in a subsequent backup operation.

4. The method claim 1, further comprising generating for each subset a corresponding list of files.

5. The method of claim 4, further comprising steaming each corresponding list of files to a corresponding subset-specific backup thread.

6. The method of claim 1, wherein each backup-thread specific de-duplicating backup process instance has associated therewith a corresponding de-duplicating backup process instance-specific local cache.

7. The method of claim 6, wherein each backup-thread specific de-duplicating backup process instance is configured to store in its associated corresponding de-duplicating backup process instance-specific local cache a hash value representative of data that has been transferred by that backup-thread specific de-duplicating backup process instance to a remote backup server.

8. The method of claim 1, wherein each backup-thread specific de-duplicating backup process uses a corresponding local cache located at the collaboration server.

9. The method of claim 8, wherein each backup-thread specific de-duplicating backup process determines whether the corresponding local cache stores a file included in the subset corresponding to the subset-specific backup thread.

10. A system to back up collaboration server data, comprising:
    a memory of other storage device configured to store a directory associated with a collaboration server dataset; and
    a processor configured to:
    receive an indication to begin backup of the collaboration server dataset;
    walk the directory in a prescribed order to divide the dataset into a prescribe number of approximately equal-sized subsets, wherein the directory comprises a plurality of files; and
    use a separate subset-specific thread to back up the subsets in parallel;
    wherein each subset-specific backup thread is configured to provide data included in that subset to a backup-thread specific de-duplicating backup process instance configured to perform de-duplication processing with respect to the subset and a corresponding subset associated with a prior backup; and wherein the corresponding subset was determined by walking the associated directory in the prescribed order at a prior time with which the prior backup is associated.

11. The system of claim 10, wherein the prescribed number of subsets corresponds to a configured maximum number of concurrent backup threads.

12. The system of claim 10, wherein the processor is further configured to generate for each subset a corresponding list of files and to stream each corresponding list of files to a corresponding subset-specific backup thread with which that list of files is associated.

13. A computer program product to back up data, the computer program product being embodied in a non-transitory computer readable storage medium and comprising computer instructions for:
    receiving an indication to begin backup of a collaboration server dataset;
    walking an associated directory in a prescribed order to divide the dataset into a prescribe number of approximately equal-sized subsets, wherein the directory comprises a plurality of files; and
    using a separate subset-specific thread to back up the subsets in parallel;
    wherein each subset-specific backup thread is configured to provide data included in that subset to a backup-thread specific de-duplicating backup process instance configured to perform de-duplication processing with respect to the subset and a corresponding subset associated with a prior backup; and wherein the corresponding subset was determined by walking the associated directory in the prescribed order at a prior time with which the prior backup is associated.

14. A method of backing up data, comprising:
receiving an indication to begin backup of a collaboration server dataset that includes two or more volumes of user data;
using a separate volume-specific thread to back up each of at least a subset of the volumes in parallel, including by providing for each volume-specific thread a corresponding volume-specific local cache of hash values associated with data that has been backed up previously by a process associated with that volume-specific thread, wherein the volume-specific local cache is located at the collaboration server;
wherein a filename of the volume-specific local cache includes volume identifying information that identifies a volume with which it is associated; and wherein the volume identifying information included in the filename the volume-specific local cache is used to ensure that in a subsequent backup of the volume the same local cache is associated with the de-duplicating backup process instance used to backup that volume.

15. The method of claim 14, wherein a separate volume-specific thread is spawned to back up each volume up to a configured maximum number of concurrent backup threads.

16. The method of claim 14, further comprising backing up one or more transaction logs in parallel with the backup of said at least a subset of the volumes.

17. The method of claim 16, wherein backing up said one or more transaction logs includes performing a first pass backup of said one or more transaction logs during backup of said at least a subset of the volumes; receiving an indication that the first pass and the backup of said at least a subset of the volumes have been completed; and based at least in part on the indication performing a second pass backup of said one or more transaction logs.

18. A system to backup collaboration data, comprising:
a processor configured to:
receive an indication to begin backup of a collaboration server dataset that includes two or more volumes of user data; and
use a separate volume-specific thread to back up each of at least a subset of the volumes in parallel, including by providing for each volume-specific thread a corresponding volume-specific local cache of hash values associated with data that has been backed up previously by a process associated with that volume-specific thread, wherein the volume-specific local cache is located at the collaboration server; and
a memory or other storage device coupled to the processor and configured to store said corresponding volume-specific local caches;
wherein a filename of the volume-specific local cache includes volume identifying information that identifies a volume with which it is associated; and wherein the volume identifying information included in the filename the volume-specific local cache is used to ensure that in a subsequent backup of the volume the same local cache is associated with the de-duplicating backup process instance used to backup that volume.

19. A computer program product to back up data, the computer program product being embodied in a non-transitory computer readable storage medium and comprising computer instructions for:
receiving an indication to begin backup of a collaboration server dataset that includes two or more volumes of user data;
using a separate volume-specific thread to back up each of at least a subset of the volumes in parallel, including by providing for each volume-specific thread a corresponding volume-specific local cache of hash values associated with data that has been backed up previously by a process associated with that volume-specific thread, wherein the volume-specific local cache is located at the collaboration server;
wherein a filename of the volume-specific local cache includes volume identifying information that identifies a volume with which it is associated; and wherein the volume identifying information included in the filename the volume-specific local cache is used to ensure that in a subsequent backup of the volume the same local cache is associated with the de-duplicating backup process instance used to backup that volume.

* * * * *